UNITED STATES PATENT OFFICE.

ROBERT LATTA CROWE, OF MEMPHIS, TENNESSEE.

QUININ SILVER-PHOSPHATE COMPOSITION AND PROCESS OF MAKING SAME.

1,399,604. Specification of Letters Patent. Patented Dec. 6, 1921.

No Drawing. Application filed February 24, 1920. Serial No. 360,831.

*To all whom it may concern:*

Be it known that I, ROBERT L. CROWE, a citizen of the United States, and a resident of Memphis, county of Shelby, and State of Tennessee, have invented a new and Improved Quinin Silver-Phosphate Composition and Processes of Making Same, of which the following is a full, clear, and exact description.

This invention relates to germicidal silver salts, and has reference more particularly to a composition which contains phosphoric acid combined with silver and alkaloidal quinin.

An object of this invention is to produce a germicidal silver salt which may be used instead of silver nitrate.

Another object of this invention is to produce a salt of the class indicated by which the irritation accompanying the use of silver nitrate is greatly removed by the combination of silver, phosphoric acid and quinin.

My improved composition is prepared by adding a solution of 100 grams of tri-sodium phosphate in 200 cubic centimeters of water to a solution of 30 grams of silver nitrate in 100 cubic centimeters of water. Silver phosphate forms and settles out as an insoluble precipitate. The mother liquor is poured, siphoned, or otherwise removed from the precipitate of silver phosphate, and said precipitate is thoroughly washed with water preferably by decantation.

Syrupy phosphoric acid is then added to the precipitate until solution is complete, and alkaloidal quinin is added to the solution until the same is completely saturated. The amount of syrupy phosphoric acid necessary to dissolve the silver phosphate is 1.5 mills acid to 1 gm. of silver phosphate. In this step the alkaloidal quinin first reacts with the silver phosphate to form a double salt which is quinin silver phosphate. The alkaloidal quinin then reacts with the excess of phosphoric acid to neutralize the solution and form quinin phosphate. Thus the finished solution contains a mixture of quinin silver phosphate and quinin phosphate, and may be used as a germicidal agent wherever silver nitrate is used. The combination of silver with quinin causes much less irritation when used as germicidal agent than silver nitrate.

I would state in conclusion that while the example described constitutes a practical embodiment of my invention, I do not limit myself strictly to the details herein described since manifestly the same can be considerably varied without departing from the spirit of the invention as defined in the appended claims.

My new silver quinin phosphate compound may be used either admixed with quinin phosphate or it may be purified and used as such.

Having thus described my invention, I claim as new and desire to secure by Letters Patent:

1. A process of making a germicidal agent which consists in adding a solution of a phosphate to a solution of silver salt to form an insoluble precipitate of silver phosphate, washing said precipitate, dissolving said precipitate in a syrupy phosphoric acid, and adding alkaloidal quinin to complete saturation.

2. A process of making a germicidal agent which consists in dissolving silver phosphate, obtained by adding a solution of tri-sodium phosphate to a solution of silver nitrate and washing the precipitate, in syrupy phosphoric acid and adding alkaloidal quinin to said solution to complete saturation.

3. The process which comprises dissolving freshly precipitated silver phosphate in syrupy phosphoric acid and adding alkaloidal quinin to said solution to complete saturation.

4. A process of making a mixture of quinin silver phosphate and quinin phosphate which consists in dissolving silver phosphate in syrupy phosphoric acid, and adding alkaloidal quinin to said solution to complete saturation.

5. The process of making a mixture of quinin silver phosphate and quinin phosphate which comprises dissolving fresh silver phosphate precipitated from a solution of silver nitrate with tri-sodium phosphate in syrupy phosphoric acid, and adding alkaloidal quinin to said solution to complete saturation.

6. The herein described new quinin silver phosphate exhibiting valuable therapeutic properties substantially as described.

7. A germicidal composition which consists of a mixture of quinin silver phosphate and quinin phosphate.

ROBERT LATTA CROWE.